United States Patent
Aulino et al.

(10) Patent No.: US 6,633,928 B2
(45) Date of Patent: Oct. 14, 2003

(54) FAST PROCESS CONTEXT SWITCHING BUFFER

(75) Inventors: Rick Aulino, Ft Collins, CO (US); Gregory M Hughes, Fort Collins, CO (US); Roland M Hochmuth, Ft Collins, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 379 days.

(21) Appl. No.: 09/726,190

(22) Filed: Nov. 29, 2000

(65) Prior Publication Data

US 2002/0065961 A1 May 30, 2002

(51) Int. Cl.[7] .................................................. G06F 3/00
(52) U.S. Cl. ................................. 710/52; 710/7; 710/8; 710/20; 710/21; 710/310
(58) Field of Search ................................. 710/52–57, 7, 710/8, 20, 21, 310

(56) References Cited

U.S. PATENT DOCUMENTS

| | | | | |
|---|---|---|---|---|
| 5,566,349 A | * | 10/1996 | Trout | 710/20 |
| 5,581,728 A | * | 12/1996 | Moritomo | 711/137 |
| 5,784,649 A | * | 7/1998 | Begur et al. | 710/52 |
| 6,216,015 B1 | * | 4/2001 | Hymel | 455/558 |
| 6,260,169 B1 | * | 7/2001 | Massoudi | 714/769 |
| 6,392,654 B1 | * | 5/2002 | Gallotta et al. | 345/503 |
| 6,442,627 B1 | * | 8/2002 | Negishi et al. | 710/52 |
| 6,496,869 B1 | * | 12/2002 | Cheng | 709/250 |

* cited by examiner

Primary Examiner—Jeffrey Gaffin
Assistant Examiner—Mike Nguyen

(57) ABSTRACT

A method for more efficient buffer control of the configuration of hardware devices. In representative embodiments of the method described in the present patent document, (1) a given configuration is permitted to span exclusive access to the hardware by other processes and (2) different configurations may share the same data buffer. Current configuration of the hardware device is maintained by always placing the current configuration at the beginning of the data buffer. This first entry, comprising the current configuration, is the header of the buffer's data. All subsequent instructions will follow this header, as will any subsequent modifications to the devices' configuration. Since instructions contained in the buffer are to be executed sequentially, the device will always be set to the correct configuration, even when exclusive access between different data sets of the buffer is lost. Because the header is written when a new data set is started and not when the data set is sent down to the device, the header will never be out of date with respect to the data that follows it.

9 Claims, 4 Drawing Sheets

FAST PROCESS CONTEXT SWITCHING BUFFER

FIELD OF THE INVENTION

The present invention relates generally to computer system hardware buffers, and, more particularly, to configuration control of the hardware via such buffers.

BACKGROUND OF THE INVENTION

Modern computer systems are capable of running multiple parallel processes in which each process may need to use the same hardware resources. As a result processes often have to wait in line with other competing processes to obtain access to hardware resources. The speed at which a given process performs its function can be increased if an intermediate storage, referred to as a buffer, is used to hold instructions, which typically is comprised of commands and data, which the process sends to a particular hardware device. The process then can continue performing its other required tasks, which may include writing data into other buffers attached to other hardware devices or into the buffer it would otherwise be waiting for. Each active hardware device that the computer controls typically has one or more blocks of memory assigned to serve as a buffer. Without buffers, a process would have to first wait until it had access to the hardware device, and then once access is obtained, it would wait until the hardware device had completed the service it requested of it. As a simple example, if a process outputs data to both a floppy disk and a printer, buffers allow the process to effectively perform both functions in parallel rather serially.

In order to reduce the overhead associated with the transfer of data from the buffer to the hardware device, the full set of instructions in the buffer, which is referred to herein as a buffer data set, is sent to the hardware device as a single unit. The contents of the buffer itself may vary in size, but nothing smaller than its full contents are sent to the hardware.

When sending data to a hardware device from multiple buffers as might occur, for example in a multiprocessing environment such as a UNIX operating system, a process must insure that the configuration for the hardware device is current. If the process loses exclusive access for the device between the time that it sends a first set of instructions from a buffer and the time that it sends a second set, the current configuration must be downloaded to the device before the second set of data is sent. It is often difficult to maintain an accurate description of the hardware configuration as various buffer data sets are downloaded.

As an example, suppose that a process wishes to first clear a background buffer of a graphics card, then draw a triangle in the background buffer, and finally transfer the contents of the background buffer to the foreground buffer for display on a monitor. Also, suppose that the clear buffer command requires configuration X, the draw triangle command requires configuration Y, and the transfer buffer contents command requires configuration Z. It is possible that one or more of these commands requires more than one buffer's full of instructions to complete the command. If another process gains exclusive access to the graphics card before or during the completion of these commands, the configuration of the card will be changed to an unknown state when the first process finally regains control. Thus, the first process will need to reset the hardware to the needed configuration which might be configuration X, Y, or Z depending upon previous buffer transfers. It is imperative than the first process maintain knowledge of the configuration in which it left the graphics card. But, this is not an easy thing to do as the process has most likely continued on beyond these commands. Thus, the process can have great difficulty in maintaining knowledge of exactly which configuration the hardware is in at the various stages of buffer transfer.

In fact, previous solutions have not permitted instructions with different configurations to share the same data buffer. Thus, whenever the configuration associated with the instructions changed, it was necessary to send whatever was in the current data buffer down to the hardware. Since configuration changes typically occur often, this method results in numerous emptying of the buffer. The overhead associated with sending small amounts of data down to the hardware device makes this method very inefficient.

Thus there is a need for a low overhead technique which would permit instructions with different configurations to share the same data buffer.

SUMMARY OF THE INVENTION

The present patent document relates to a novel method for maintaining control of the configuration of a hardware device even when multiple processes are accessing the same device. Previous methods for maintaining such control over the hardware configuration have relied upon emptying the buffer associated with the hardware device or upon reading the configuration back from the hardware device.

In representative embodiments of the present patent document, methods are disclosed which permit (1) a given configuration to span exclusive access to the hardware device by other processes and (2) different configurations to share the same data buffer. Current configuration of the hardware device is maintained by always placing the current configuration at the beginning of the data buffer. Whenever a new set of data is written into the buffer, the current configuration is placed at the beginning of the buffer. This first entry comprising the current configuration is the header of the buffer's data. All subsequent instructions will follow this header, as will any subsequent modifications to the devices' configuration. Since instructions contained in the buffer are to be executed sequentially, the device will always be set to the correct configuration, even when exclusive access between different data sets of the buffer is lost. Because the header is written when a new data set is started and not when the data set is sent down to the device, the header will never be out of date with respect to the data that follows it.

The size of the header should be small when compared to the overall size of the buffer so that the overhead of creating the header can be amortized across the time it takes to actually fill up the buffer with instructions. In addition, if the header is too large, the buffer will need to be emptied more often, reducing the benefits of the header.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

Figure 1A:
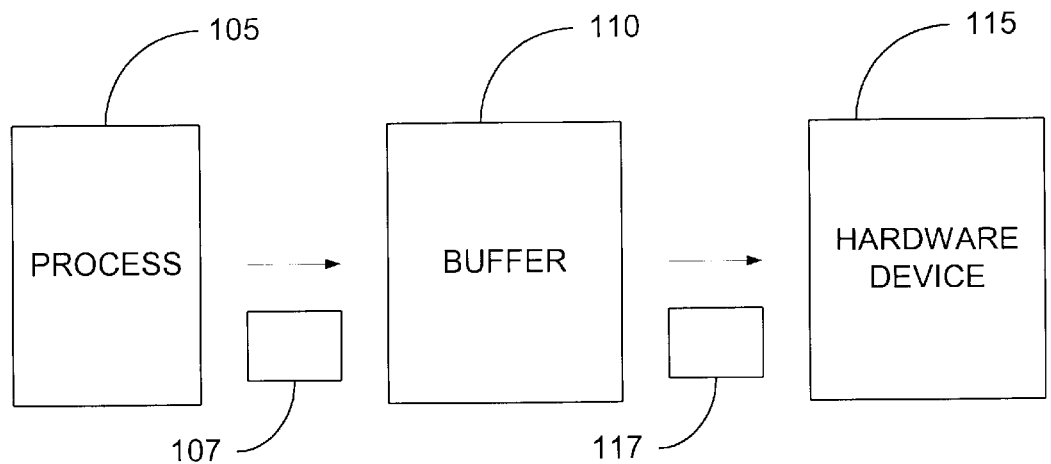
FIG. 1A is a drawing of a buffer which interacts with a process and a hardware device as described in various representative embodiments of the present patent document.

1. Introduction:

As shown in the drawings for purposes of illustration, the present patent document relates to a novel method for maintaining control of the configuration of a hardware device even when multiple processes are accessing the same device. Previous methods for maintaining such control over the hardware configuration have relied upon emptying the buffer associated with the hardware device or upon reading the configuration back from the hardware device.

In the following detailed description and in the several figures of the drawings, like elements are identified with like reference numerals.

2. Discussion:

In representative embodiments of the present patent document, methods are disclosed which permit (1) a given configuration to span exclusive access to the hardware device by other processes and (2) different configurations to share the same data buffer. Current configuration of the hardware device is maintained by always placing the current configuration at the beginning of the data buffer. Whenever a new set of data is written into the buffer, the current configuration is placed at the beginning of the buffer. This first entry comprising the current configuration is the header of the buffer's data. All subsequent instructions will follow this header, as will any subsequent modifications to the devices' configuration. Since instructions contained in the buffer are to be executed sequentially, the device will always be set to the correct configuration, even when exclusive access between different data sets in the buffer is lost. Because the header is written when a new data set is started and not when the data set is sent down to the device, the header will never be out of date with respect to the data that follows it.

The size of the header should be small when compared to the overall size of the buffer so that the overhead of creating the header can be amortized across the time it takes to actually fill up the buffer with instructions. In addition, if the header is too large, the buffer will need to be emptied more often, reducing the benefits of the header.

The buffer could be controlled by the computer's central processing unit (CPU) or by the hardware device. Also, the memory for the buffer could be the computer main memory or memory on the card of the hardware device.

FIG. 1A is a drawing of a buffer 110 which interacts with a process 105 and a hardware device 115 as described in various representative embodiments of the present patent document. The process 105 writes instructions 107 typically one at a time for controlling the hardware device 115 into the buffer 110. Periodically the buffer 110 is emptied by transmitting all the instructions it contains to the hardware device 115 as a single logical data unit 117.

Figure 1B:
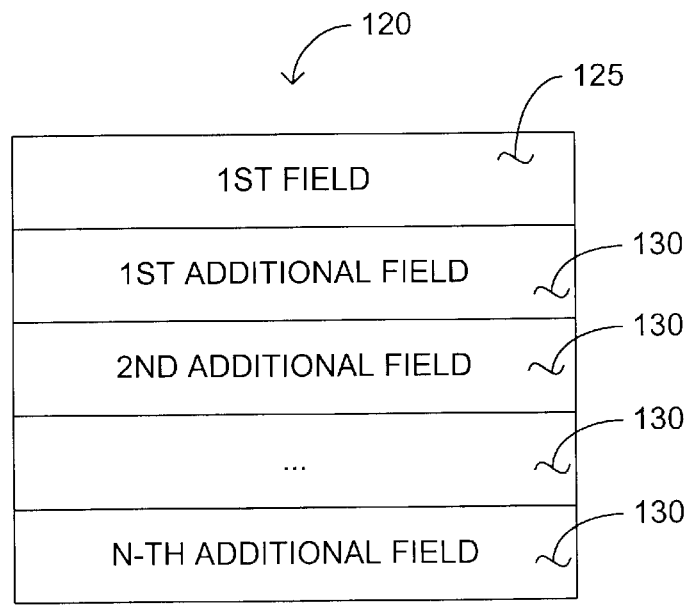
FIG. 1B is a drawing of a data structure for the buffer as described in various representative embodiments of the present patent document.

FIG. 1B is a drawing of a data structure 120 for the buffer 110 as described in various representative embodiments of the present patent document. The data structure 120 comprises a first field 125 containing data representing a current configuration 125 of the hardware device 115 and at least one additional field 130 containing data representing instructions comprising commands plus data for controlling the hardware device 115. The number of additional fields 130 is selected by the system and is generally a number that would help optimize system performance.

Figure 2A:
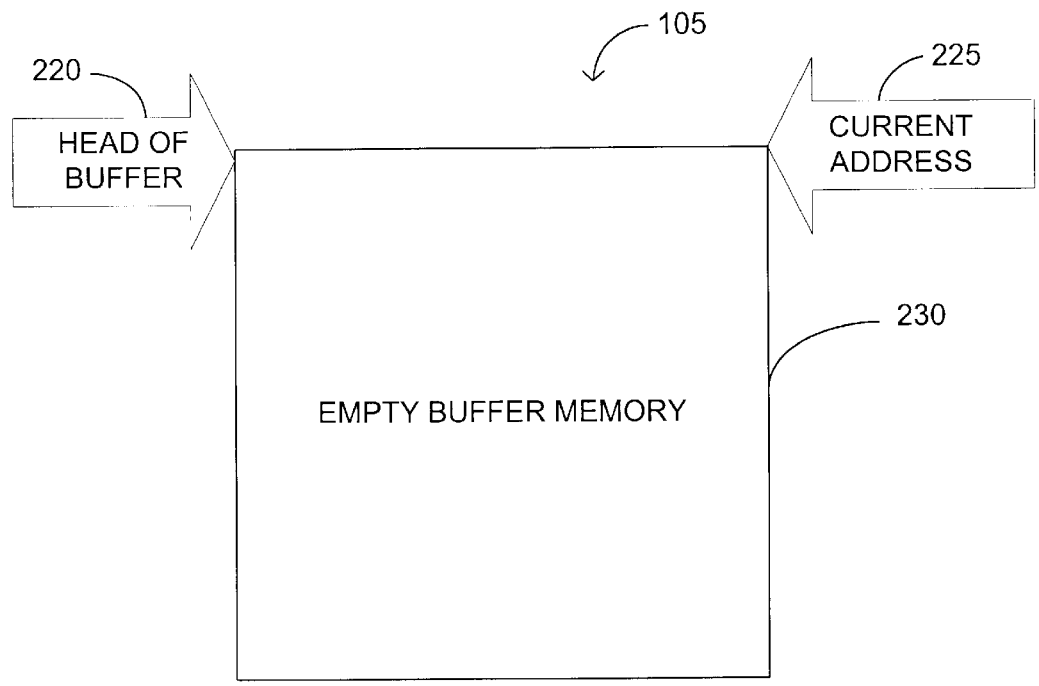
FIG. 2A is a drawing of the buffer as described in various representative embodiments of the present patent document.

FIG. 2A is a drawing of the buffer 110 as described in various representative embodiments of the present patent document. The buffer 110 as shown in FIG. 2A is empty and has a head of buffer pointer 220 and a current address pointer 225 pointing to the beginning of the buffer 110. Memory allocated to the buffer 110 is shown as empty buffer empty 230. The buffer 110 is shown in the configuration that it would be prior to any data having been written into it or immediately following the emptying of its contents to the hardware device 115.

Figure 2B:
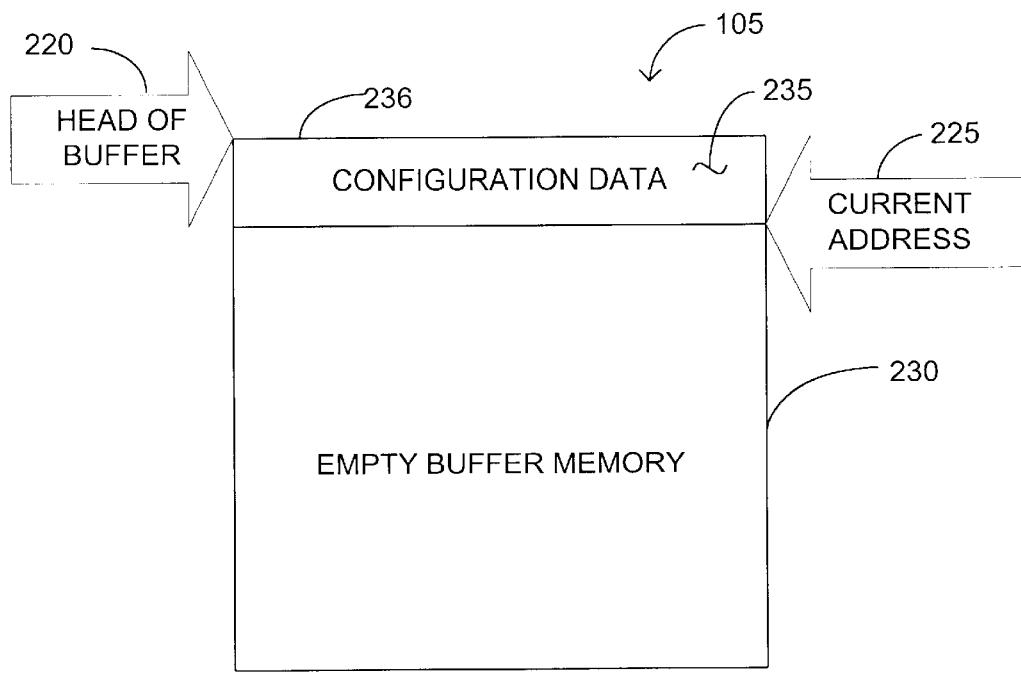
FIG. 2B is another drawing of the buffer as described in various representative embodiments of the present patent document.

FIG. 2B is another drawing of the buffer 110 as described in various representative embodiments of the present patent document. In FIG. 2B, a header data entry 235, also referred to herein as a first data entry 235, which comprises configuration data 235 describing the configuration of the hardware device 115 has been written into the buffer 110 in a first memory segment 236 implied by FIG. 1B but not specifically indicated therein. The head of buffer pointer 220 continues to point to the beginning of the buffer 110, but the current address pointer 225 has been moved to the end of the header 235. While the memory allocated to the buffer 110 is indicated in the figures as a block of memory it will be understood by one skilled in the art that the memory may or may not lie contiguous in physical memory.

Figure 2C:
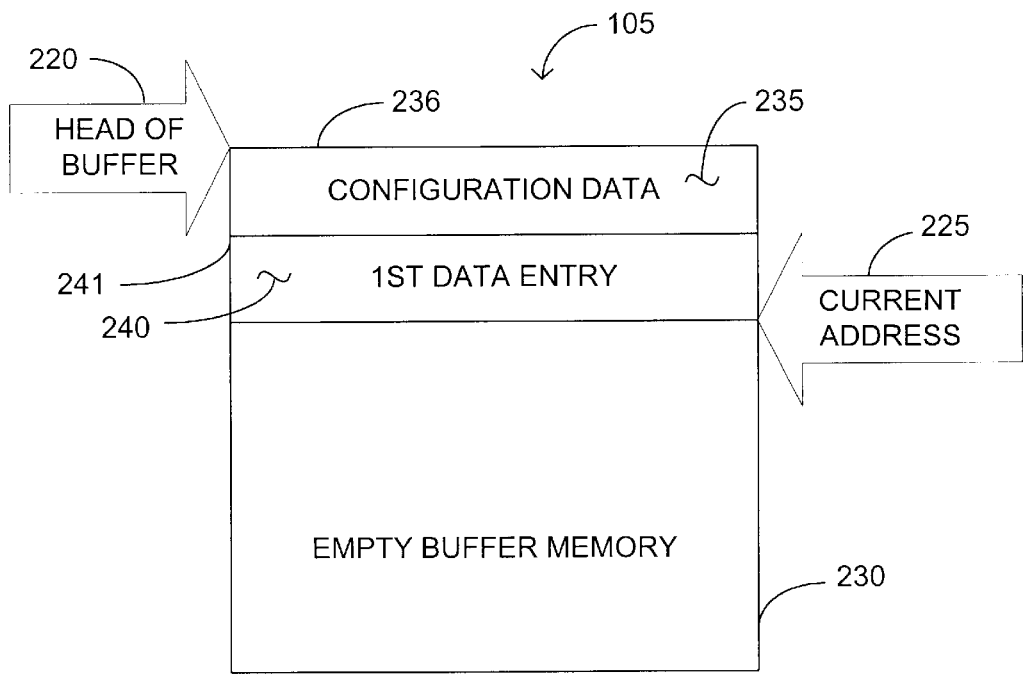
FIG. 2C is yet another drawing of the buffer as described in various representative embodiments of the present patent document.

FIG. 2C is yet another drawing of the buffer 110 as described in various representative embodiments of the present patent document. In FIG. 2C, a first additional data entry 240 comprising an instruction for controlling the hardware device 115 has been written into the buffer 110 in an additional memory segment 241 implied by FIG. 1C but not specifically indicated therein. Again, the head of buffer pointer 220 continues to point to the beginning of the buffer 110, but the current address pointer 225 has been moved to the end of the first additional data entry 240.

Figure 2D:
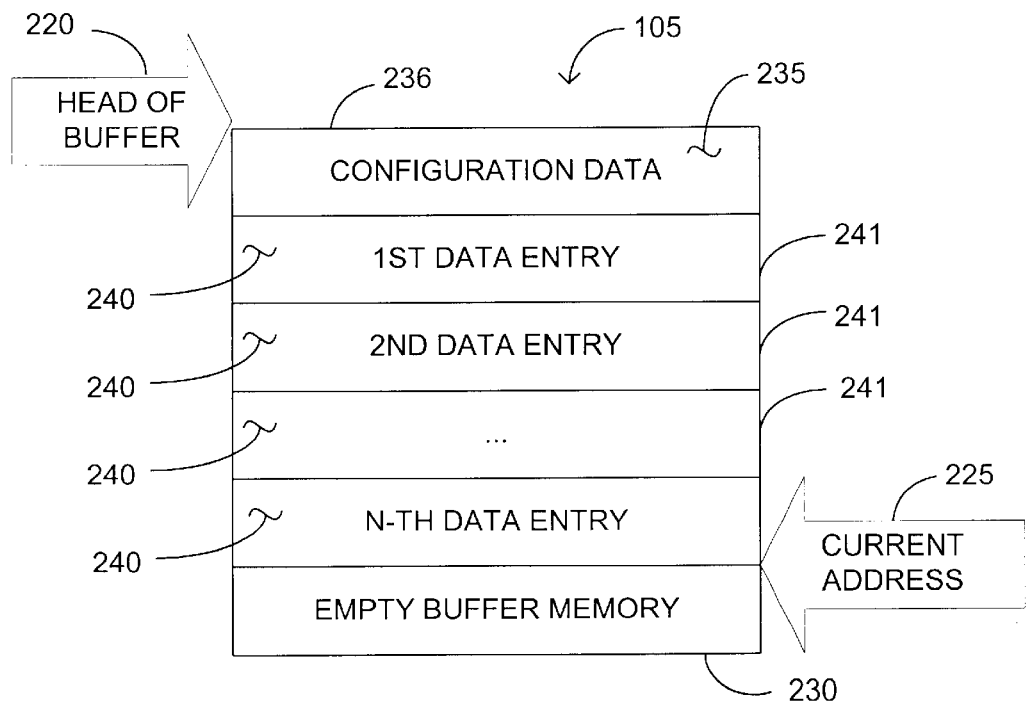
FIG. 2D is still another drawing of the buffer as described in various representative embodiments of the present patent document.

FIG. 2D is still another drawing of the buffer 110 as described in various representative embodiments of the present patent document. In FIG. 2D, a total of "n" additional data entries 240 comprising instructions for controlling the hardware device 115 have been written into the buffer 110 in additional memory segments 241 implied by FIG. 1D but not specifically indicated therein. Again, the head of buffer pointer 220 continues to point to the beginning of the buffer 110, but the current address pointer 225 has been moved to the end of the n-th additional data entry 240.

First and second memory segments 236, 241 could be, for example, allocated in memory selected from the group consisting of a computer main memory, a card that controls the hardware device, floppy disc, a compact disk, a DVD, and a remotely located disk.

Figure 3:
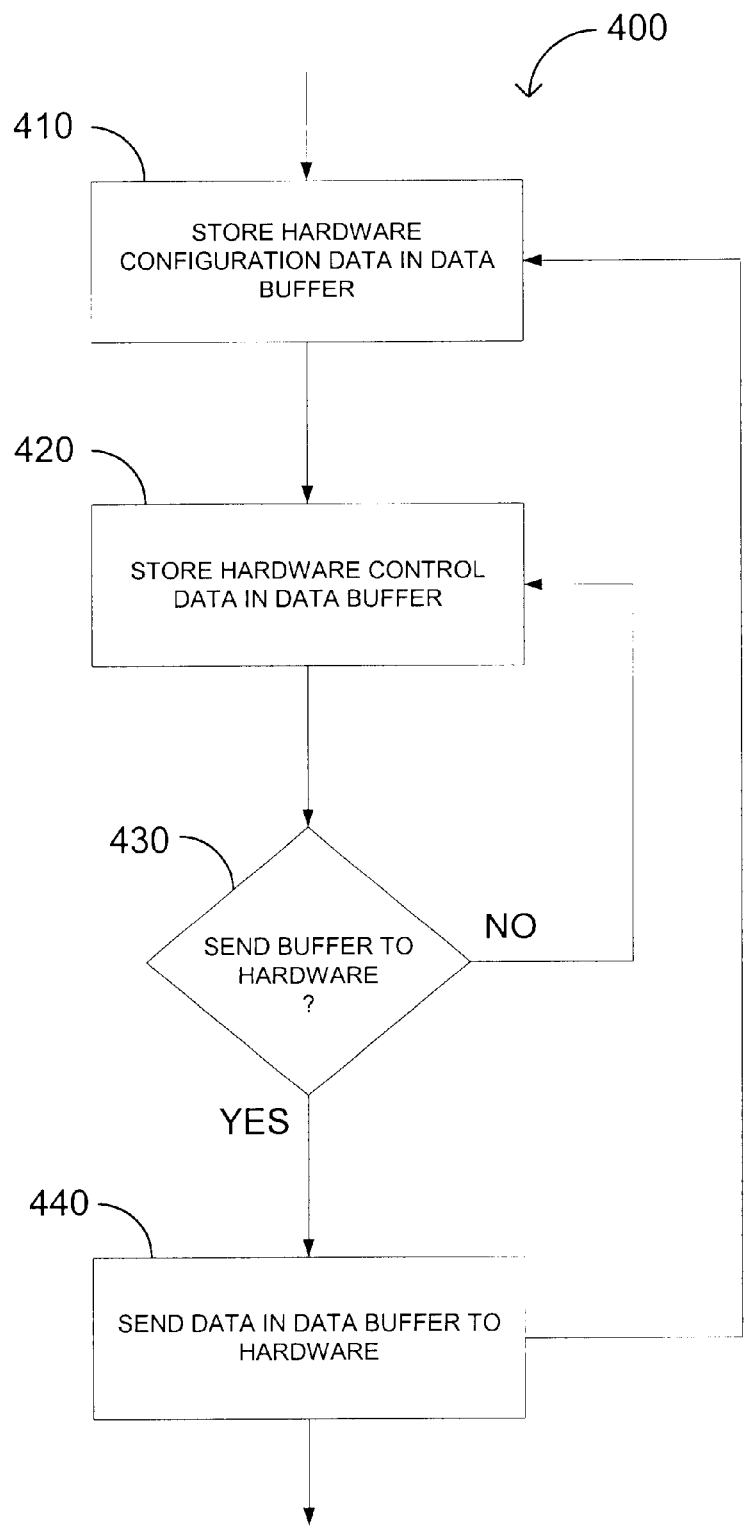
FIG. 3 is a flow chart of a method for controlling hardware device configuration as described in various representative embodiments of the present patent document.

FIG. 3 is a flow chart of a method 400 for controlling hardware device 115 configuration as described in various representative embodiments of the present patent document. In block 410 header data entry 235 comprising hardware configuration data is stored in the first memory segment 236. Block 410 then transfers control to block 420.

In block 420 additional data entry 240 comprising hardware control data is stored in additional memory segment 241. Block 420 then transfers control to block 430.

When it is determined to send the data stored in the buffer 110 to the hardware device 115, block 430 transfers control to block 440. Otherwise, block 430 transfers control to block 420 upon receipt of an additional hardware control instruction.

Block 440 transfers the data in the buffer 110 to the hardware device 115 as a single logical data unit 117. Block 440 then transfers control to block 410.

3. Concluding Remarks:

In representative embodiments of the method described in the present patent document, (1) a given configuration is permitted to span exclusive access to the hardware device by other processes and (2) different configurations may share the same data buffer. Current configuration of the hardware device is maintained by always placing the current configuration at the beginning of the data buffer. This first entry, comprising the current configuration, is the header of the buffer's data. All subsequent instructions will follow this header, as will any subsequent modifications to the devices' configuration. Since instructions contained in the buffer are to be executed sequentially, the device will always be set to the correct configuration, even when exclusive access between different data sets of the buffer is lost. Because the header is written when a new data is started and not when the data set is sent down to the device, the header will never be out of date with respect to the data that follows it.

Primary advantages of the embodiment as described in the present patent document over prior methods is that a given configuration is permitted to span exclusive access of the hardware device by other processes and different configurations may share the same data buffer. Thus, it is not required to empty the buffer for every change in hardware device configuration resulting in a more efficient process.

While the present invention has been described in detail in relation to representative embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A computer-readable medium having stored thereon a data structure for a buffer, comprising:
    a first field containing data representing a current configuration of a hardware device;
    at least one additional field associated with the first field containing commands for controlling the hardware device;
    a second field containing a second configuration; and
    at least one additional field associated with the second field and containing commands for controlling the hardware device;
    wherein said first field and its associated at least one additional field pertain to a first process and said second field and its associated at least one additional field pertain to a second process.

2. A computer program storage medium readable by a computer, tangibly embodying a computer program of instructions executable by the computer to perform method steps for controlling a hardware device, the steps comprising:
    storing a first data entry in a first memory segment, wherein the first data entry comprises a current configuration of the hardware device;
    storing at least one additional data entry associated with the first data entry in at least one additional memory, wherein the additional data entries comprise commands for controlling the hardware device;
    storing a second data entry in a second memory segment, wherein the second data entry comprises a configuration of the hardware device;
    storing at least one additional data entry associated with the second data entry in at least one additional memory segment, wherein the additional data entries comprise commands for controlling the hardware device; and
    transferring, in order as a single logical data unit, the first data entry, additional data entries associated with the first data entry, the second data entry, and additional data entries associated with the second data entry to the hardware device;
    wherein the first data entry and second data entry pertain to separate processes.

3. A computer program storage medium as recited in claim 2, the method steps further comprising:
    allocating memory for the first memory segment; and
    allocating memory for additional memory segments.

4. A computer program storage medium as recited in claim 3, wherein:
    first and second memory segments are allocated in memory selected from the group consisting of a computer main memory, a hardware device, floppy disc, a compact disk, a DVD, and a remotely located disk.

5. A computer operable method for controlling a hardware device, comprising the steps of:
    storing a first data entry in a first memory segment, wherein the first data entry comprises a current configuration of the hardware device;
    storing at least one additional data entry in at least one additional memory segment associated with the first data entry, wherein the additional data entries comprise commands for controlling the hardware device;
    storing a second data entry in a second memory segment containing a configuration of the hardware device;
    storing at least one additional data entry following the second memory segment and associated with the second data entry, and containing commands to control the hardware device; and
    transferring, in order as a single logical data unit, the first data entry, the subsequently stored additional data entries associated with the first data entry, the second data entry, and the subsequently stored additional data entries associated with the second data entry to the hardware device;
    wherein the first and second data entries are written by separate processes.

6. A computer operable method as recited in claim 5, the method steps further comprising:
    allocating memory for the first memory segment; and
    allocating memory for additional memory segments.

7. A computer operable method as recited in claim 6, providing:

first and second memory segments are allocated in memory selected from the group consisting of a computer main memory, a hardware device, floppy disc, a compact disk, a DVD, and a remotely located disk.

8. A system, comprising:

a processor;

multiple processes running on the processor;

a configurable device coupled to the processor; and a buffer coupled to the processor and writeable by the processes;

wherein the buffer concurrently stores configuration information and commands of multiple processes, and a process is capable of writing configuration information into the buffer to configure the configurable device differently than at least one other process.

9. The system of claim 8 wherein the configuration information and commands stored in the buffer are provided to the configurable device.

* * * * *

UNITED STATES PATENT AND TRADEMARK OFFICE
CERTIFICATE OF CORRECTION

PATENT NO. : 6,633,928 B2  
DATED : October 14, 2003  
INVENTOR(S) : Rick Aulino et al.

It is certified that error appears in the above-identified patent and that said Letters Patent is hereby corrected as shown below:

Column 6,  
Line 10, after "memory" insert -- segment --

Signed and Sealed this

Fifth Day of April, 2005

JON W. DUDAS  
*Director of the United States Patent and Trademark Office*